(12) United States Patent
LaVallee

(10) Patent No.: US 11,802,347 B2
(45) Date of Patent: Oct. 31, 2023

(54) 2-SHOT MOLDED ARTICLE WITH MULTIPLE ELECTRICAL CURRENT PATHWAYS

(71) Applicant: Lacks Enterprises, Inc., Grand Rapids, MI (US)

(72) Inventor: Michael LaVallee, Grand Rapids, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 476 days.

(21) Appl. No.: 16/597,545

(22) Filed: Oct. 9, 2019

(65) Prior Publication Data

US 2020/0109482 A1  Apr. 9, 2020

Related U.S. Application Data

(60) Provisional application No. 62/743,131, filed on Oct. 9, 2018.

(51) Int. Cl.
*C25D 5/56* (2006.01)
*B29C 45/14* (2006.01)
(Continued)

(52) U.S. Cl.
CPC .......... *C25D 5/56* (2013.01); *B29C 45/14336* (2013.01); *B29C 45/14811* (2013.01);
(Continued)

(58) Field of Classification Search
CPC .. C25D 5/56; C25D 5/627; C25D 5/10; B29C 45/14336; B29C 45/14811; B29C 45/1679; B29C 2045/169; B29L 2031/3041
See application file for complete search history.

(56) References Cited

U.S. PATENT DOCUMENTS 5,852,100 A * 12/1998 Sadatoshi ............... C08L 23/16
  524/505
5,935,691 A * 8/1999 Tsai ....................... B29C 48/19
  428/518

(Continued)

OTHER PUBLICATIONS

Svenson "DuraChrome Hard Chromium Plating", Plating Resources, Inc. Cocoa, FL, USA 1980, 2006, 40 pages.

*Primary Examiner* — Travis M Figg
(74) *Attorney, Agent, or Firm* — Dickinson Wright PLLC

(57) ABSTRACT

A molded article includes a first plateable region spaced apart from a second plateable region the first plateable region by a barrier of electrically insulating material. Each of the plateable regions include an associated plateable layer of electrically conductive material for being electroplated with a different plateable finish. Several different geometries and configurations of the barrier and/or the plateable regions are provided to prevent migration of plating material from one of the plateable regions acting as bipolar electrode while another one of the plateable regions is being electroplated. A non-plateable insert may be disposed between the plateable regions to prevent migration of plating material from one of the plateable regions onto the other one of the plateable regions. A conducive robber in electrical communication with one of the one of the plateable regions, and which may be removable, may also be used to prevent migration of plating material.

18 Claims, 5 Drawing Sheets

(51) Int. Cl.
*B29C 45/16* (2006.01)
*C25D 5/00* (2006.01)
*C25D 5/10* (2006.01)
*B29L 31/30* (2006.01)

(52) U.S. Cl.
CPC ............ B29C 45/1679 (2013.01); C25D 5/10 (2013.01); C25D 5/627 (2020.08); *B29C 2045/169* (2013.01); *B29L 2031/3041* (2013.01)

(56) References Cited

U.S. PATENT DOCUMENTS

| | | | |
|---|---|---|---|
| 2002/0197492 A1* | 12/2002 | Hao | C25D 5/022 |
| | | | 428/457 |
| 2004/0007471 A1* | 1/2004 | Phu | C25D 5/56 |
| | | | 205/136 |
| 2012/0164398 A1* | 6/2012 | Reeder | C23C 18/1653 |
| | | | 156/150 |
| 2014/0329045 A1* | 11/2014 | Jones | E04F 13/0866 |
| | | | 428/419 |
| 2016/0333483 A1 | 11/2016 | LaVallee | |
| 2016/0333491 A1* | 11/2016 | LaVallee | C23C 18/1653 |

* cited by examiner

2-SHOT MOLDED ARTICLE WITH MULTIPLE ELECTRICAL CURRENT PATHWAYS

CROSS-REFERENCE TO RELATED APPLICATIONS

This application claims the benefit of U.S. Provisional Application No. 62/743,131 filed Oct. 9, 2018 and entitled "2-Shot Molded Article with Multiple Electrical Current Pathways". The entire disclosure of the above application is incorporated herein by reference as though set forth fully herein.

BACKGROUND OF THE INVENTION

1. Field of the Invention

A molded article with two or more different plated finishes is provided.

2. Discussion

Several different industries are increasingly interested in using molded parts having metalized finishes. The automotive industry is particularly interested in incorporating metalized plastic parts into vehicles. As technologies and consumer tastes have matured, the desire for more complicated parts and designs has evolved. As such, it has become more desirous to incorporate multiple finishes into a single component. This mixing of finishes not only adds to the perception of value for the part or product, but it has the advantage of being more economical. Assembling multiple parts into a single component adds cost through additional tooling, increased inventory, and assembly requirements. There are also issues with uniform fit of the various pieces as well as complications from parts not being completely secure in the assembly leading to squeaks and rattles from vibration, i.e., for automotive applications. Therefore, the automotive industry is increasingly interested in providing parts, such as trim components, that provide two or more different plated finishes to provide unique finishes and/or visual effects.

The automotive industry has seen numerous efforts to provide multiple finishes onto a part using methods incorporating two or multiple shot moldings. Typically, these moldings are comprised of a part consisting of at least one plateable resin and one or more non-plateable resins. The non-plateable resin is chosen to be capable of being inert to the metal plating process while still providing a finished attractive appearance. In this manner, the finished part will contain a metalized plated finish in addition to one or more exposed colored or clear plastic finishes where metal does not plate.

One such attempt is disclosed in Reeder (US2012/0225255) which discloses a process for making a plastic component having both metallized and non-metallized surface regions. Reeder teaches forming a first polymeric component. The first component is subjected to a hot stamping process to apply a colored film to one or more portions of its surface. The first component is then subjected to a vacuum metalizing process to apply a metal surface to other portions of the first component. After forming a second polymeric component, Reeder teaches subjecting it to an electroless deposition process to create a metal surface thereon. The first and second polymeric components are assembled to form a completed part having multiple surface finishes. This process is time consuming and expensive as it require multiple steps and processes.

Phu (US 2004/0007471) discloses another such process involving selective plating of different portions of an injection molded part. The part includes multiple portions that are successively plated with different finishes. The part includes portions forms of a plastic plateable material and an insulative material that serves to delaminate portions of the plateable material. The part is then subjected to multiple dipping process where with the various portions to be plated successively charged to provide a part with multiple metal finishes. Again, this process requires multiple separate processes and is therefore time consuming, labor intensive and costly.

SUMMARY OF THE INVENTION

The present disclosure provides for a molded article with an insulating barrier disposed between two separate plateable regions configured to prevent migration of plating material from one of the plateable regions while another one of the plateable regions is being electroplated.

Several different geometries and configurations of the barrier and/or the plateable regions are provided to prevent migration of plating material from one of the plateable regions while another one of the plateable regions is being electroplated.

According to an aspect of the disclosure, the barrier may include an outer barrier surface that is non-coplanar with an outer surface of one or both of the plateable portions at a location immediately adjacent to the barrier.

According to another aspect, one of the plateable portions may include an irregular portion adjacent the barrier to prevent the plating material from migrating from one of the plateable portions when the other one of the plateable portions is being electroplated.

According to another aspect, a non-plateable insert is disposed between the plateable regions to prevent migration of plating material from one of the plateable regions onto the other one of the plateable regions. The non-plateable insert may be configured to be removed after the plateable portions are electroplated.

According to another aspect, a conductive robber may be formed in electrical communication with one of the plateable regions and may be configured to be removed after the plating process is complete.

BRIEF DESCRIPTION OF THE DRAWINGS

Other aspects of the present invention will be readily appreciated, as the same becomes better understood by reference to the following detailed description when considered in connection with the accompanying drawings wherein.

DESCRIPTION OF THE DISCLOSURE

Figure 1:
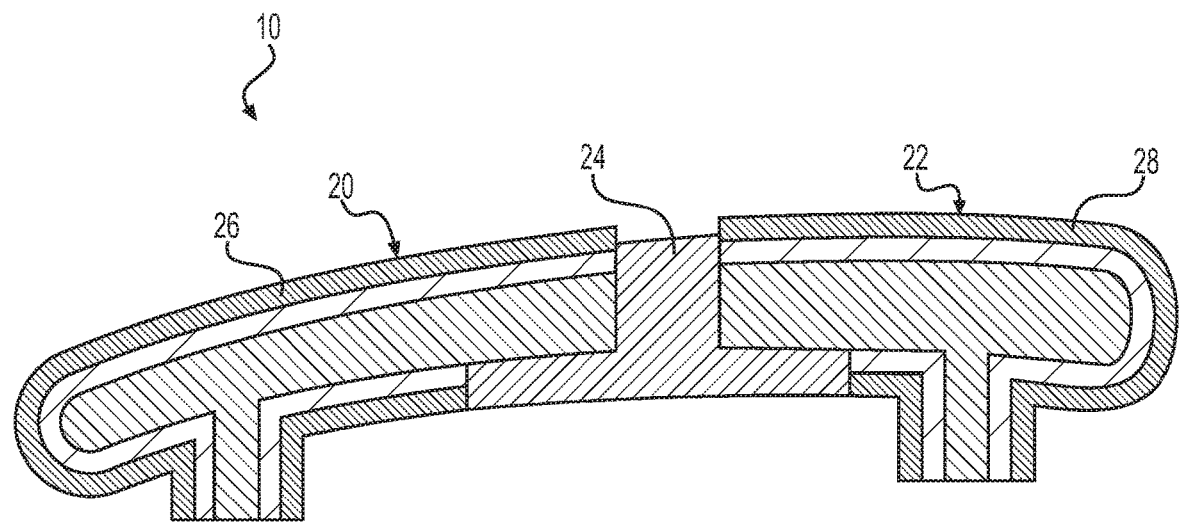
FIG. 1 is a cross-sectional view of a part with two separate plateable regions according to an aspect of the present disclosure.

Referring to the Figures, wherein like numerals indicate corresponding parts throughout the several views, a molded article 10 with two separate plateable regions 20, 22 is provided. As shown in FIG. 1, the molded article 10 includes a first plateable region 20 and a second plateable region 22 spaced apart from the first plateable region by a barrier 24 of electrically insulating material. According to an aspect, the first plateable region 20 can include a first plateable layer 26 of electrically conductive material capable of receiving an electroplated metal finish, such as bright chrome, low gloss satin chrome, black chrome, trivalent chrome, or another plateable finish. The second plateable region 22 can include a second plateable layer 28 of electrically conductive material capable of receiving an electroplated metal finish, such as bright chrome, low gloss satin chrome, black chrome, trivalent chrome, or another plateable finish. According to an aspect, the barrier 24 may be formed of a non-conductive resin and functions to electrically isolate the different plateable regions 20, 22, allowing them to be separately plated with different finishes. It will be appreciated that the barrier can take on various forms and can be formed in a variety of different ways. It will also be appreciated that a variety of different metal finishes may be employed.

Figure 2:
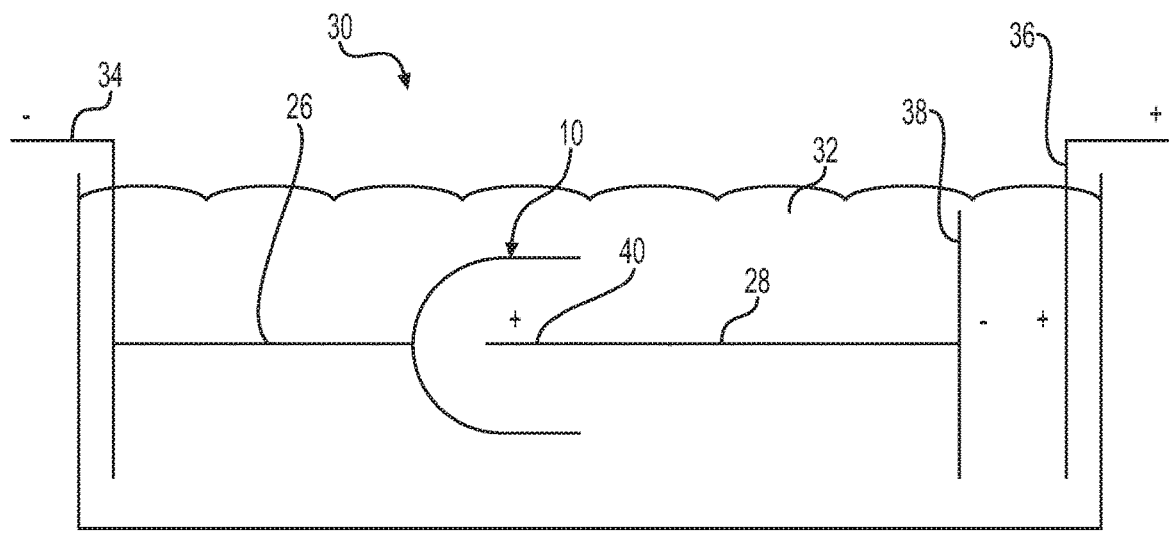
FIG. 2 is a schematic side view of a part with two separate plateable regions within an electroplating bath according to an aspect of the present disclosure.

With reference to FIGS. 1 and 2 which schematically illustrate the first plateable region 20 of the molded article 10 with two separate plateable regions 20, 22 being electroplated in an electroplating bath 30 in which the molded article 10 is submerged in a plating solution 32. As shown, a cathode connection 34 is electrically connected to the first plateable region 20 to cause positive ions to be deposited thereon to form the first plateable layer 26 from the plating solution 32. An anode 36 is submerged in the plating solution 32 and is energized with a positive voltage relative to the cathode connection 34 for inducing an electrical current therebetween and to provide the positive ions in the plating solution 32. In other words, the first plateable region 20 functions as a cathode and receives the positive ions that are oxidized from the anode 36 by action of the electrical current.

As also illustrated in the figures, the second plateable region 22 is electrically isolated from each of the cathode connection 34 and the anode 36. However, despite this isolation, the second plateable region 22 may experience a charge separation between a collector end 38 and a discharge end 40 that is adjacent to the first plateable layer 26 such that the second platable region may still have a second plateable layer 28 deposited thereon. Although the second plateable region 22 has no electrical connection to either the first plateable layer 26 or the anode 36, it becomes polarized in solution due to the current taking the path of least resistance. The second plateable region 22 may therefore act as a bipolar electrode. Since the bipolar portion (second plateable layer 28) conducts electricity more readily than the solution, current will prefer to pass through the metal bipolar part rather than the solution. As shown in FIG. 2, the second plateable region 22 can become cathodic near the anode 36 and anodic near the first plateable layer 26, causing it to function as the cathode. Therefore, material may be oxidized from the discharge end 40 of the second plateable layer 28 and migrate to the first plateable region 22, where the material is deposited.

In other words, when a first plateable layer 26 of a first plateable region 20 of a molded article 10 with two separate and electrically isolated plateable regions 20, 22 is subjected to current, the non-electrified second plateable region 22 will become polarized. The degree of the polarization depends on the spacing between the plateable regions 20, 22 and the shape of the interface therebetween. In practice, when one of the plateable regions 20, 22 becomes a bipolar electrode, it will deplate by losing material into the plating solution 32 and act as an auxiliary electrode. In this scenario, extra plate will deposit in the high current areas nearest the bipolar electrode.

The issue of deplating one of the plateable regions 20, 22 is a problem since it can create a visible defect. In other words, this effect is detrimental for the first plateable layer 26, in that it may be electroplated with an undesirable type of material from the second plateable layer 28, which may cause an uneven or discolored finish. This is also detrimental for the second plateable layer 28 which may also be unevenly coated as a result of material being oxidized from areas proximate to the first plateable layer 26. The deplating effect can be mitigated by decreasing the voltage, but this has the disadvantage of increasing the plating time. The deplating effect can also be mitigated by increasing the size of the non-conductive barrier 24 which separates the plateable regions 20, 22. However, it may not be aesthetically pleasing to have wide gaps between the different plateable regions 20, 22. According to an aspect, it is possible to structure the plateable/non-plateable resin interface to reduce the current density of the bipolar zone. This has the desired effect of enabling designs where the electrically isolated plateable regions 20, 22 may be closer together which will create a visual look that is more pleasing to the consumer.

As shown in the exemplary aspects of FIGS. 3-17, the barrier 24 and/or the plateable layers 26, 28 may be provided in various different arrangements configured to reduce high current density (HCD) edges of either of the plateable regions 20, 22 and to prevent migration of plating material from one of the plateable regions 20, 22 while a plateable layer 26, 28 on another one of the plateable regions 20, 22 is being electroplated. The provided arrangements are also intended to minimize the visible size of the barrier 24, allowing the plateable regions 20, 22 to appear in close proximity to one another. It will be appreciated that the sequence in which the various plateable surfaces may be plated may vary. For example, according to one aspect, the first plateable region may be plated before the second plateable region. According to another aspect, the second plateable region may be plated before the first plateable region. More specifically, for parts that are non-symmetrical, the sequence in which the surfaces is plated is not critical.

Figure 3:
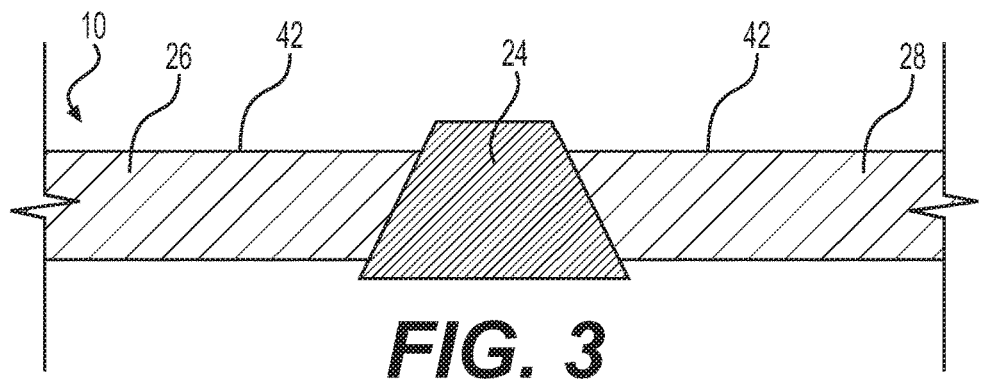
FIG. 3 is a cross-sectional side view of a part with an exemplary insulating barrier between two separate plateable regions according to an aspect of the present disclosure.
Figure 4:
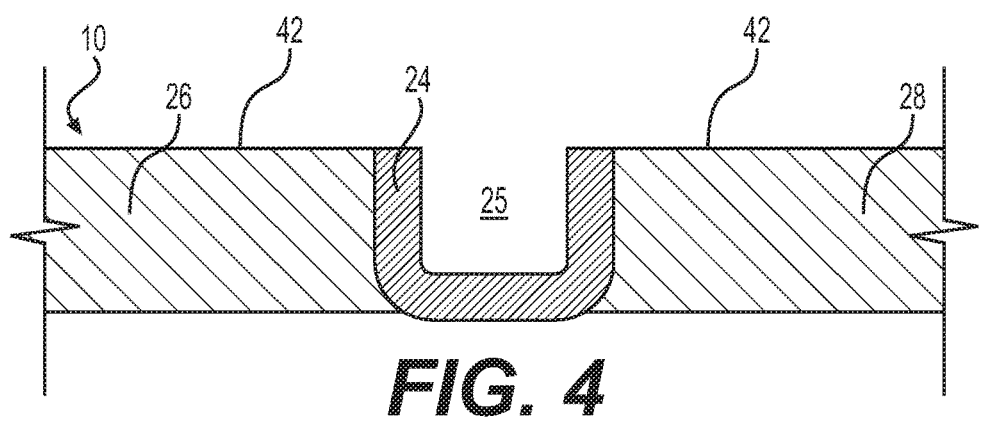
FIG. 4 is a cross-sectional side view of a part with an exemplary insulating barrier between two separate plateable regions according to another aspect of the present disclosure.
Figure 5:
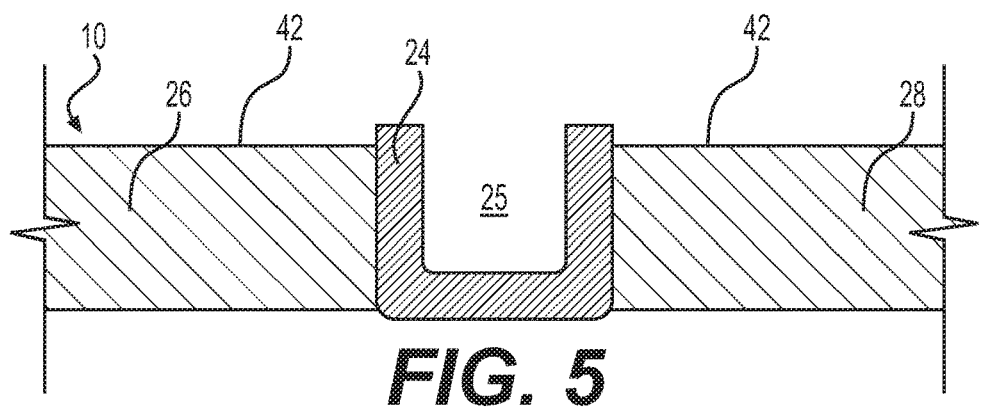
FIG. 5 is a cross-sectional side view of a part with an exemplary insulating barrier between two separate plateable regions according to still another aspect of the present disclosure.
Figure 6:
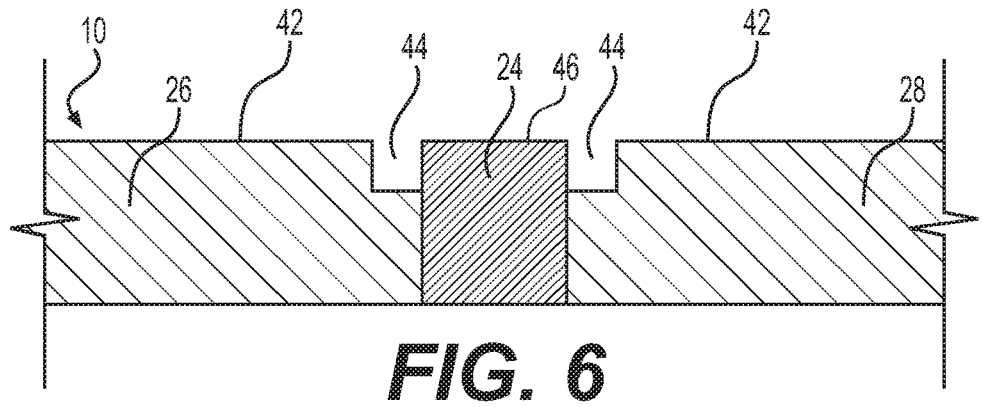
FIG. 6 is a cross-sectional side view of a part with an exemplary insulating barrier between two separate plateable regions according to a further aspect of the present disclosure.
Figure 10:
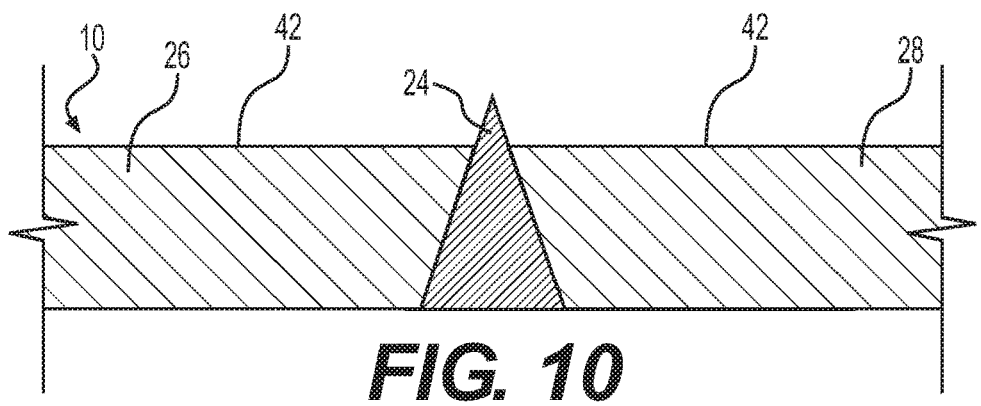
FIG. 10 is a cross-sectional side view of a part with an exemplary insulating barrier between two separate plateable regions according to still yet a further aspect of the present disclosure.
Figure 11:
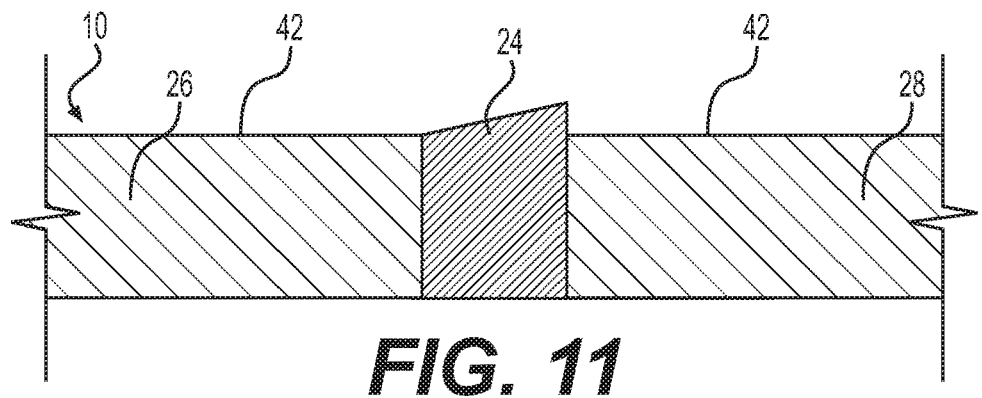
FIG. 11 is a cross-sectional side view of a part with an exemplary insulating barrier between two separate plateable regions according to another aspect of the present disclosure.
Figure 14:
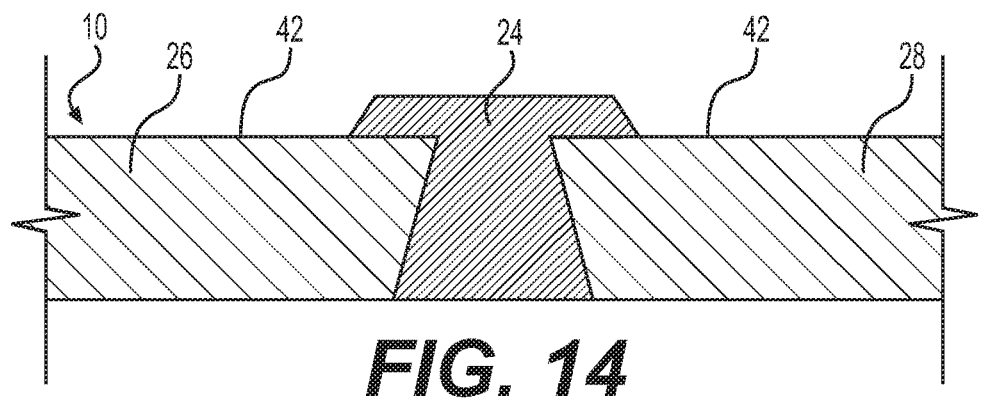
FIG. 14 is a cross-sectional side view of a part with an exemplary insulating barrier between two separate plateable regions according to still yet another aspect of the present disclosure.

According to an aspect, the geometry of the barrier 24 may be configured to prevent the plating material from migrating from one of the plateable portions 26, 28 when the other one of the plateable portions 26, 28 is being electroplated. For example, the barrier 24 may be generally trapezoidal in cross-section taken through the barrier 24 and each of the plateable portions 26, 28 as shown in FIG. 3. As another example, the barrier 24 may be U-shaped in a cross-section taken through the barrier 24 and each of the plateable portions 26, 28 as shown in FIGS. 4 and 5. According to this aspect, the U-shaped barrier 24 can define a central groove 25, which may help with mold shutoff. The barrier 24 may have a rectangular cross-section as shown in FIG. 6. The barrier 24 may be triangular in a cross-section taken through the barrier 24 and each of the plateable portions 26, 28 as shown in FIG. 10. The barrier 24 may be T-shaped in cross-section, as shown in the example of FIG. 14. More specifically, the barrier 24 may be configured such that arms of the barrier extend over each of the plateable portions 26, 28. It will be appreciated that other configurations and geometries of the barrier 24 may be employed and are within the scope of the present disclosure, and the above are just a few illustrative examples. For example, the barrier may take on the shape of a parallelogram or the outer surface of the barrier may have a variety of different geometries, including curved or arced.

According to an aspect, one or both of the plateable portions 26, 28 includes an outer surface 42 that functions as a class-A surface, which may be directly visible to and/or touched by a user. It may be critical to provide the class-A surfaces, such as the outer surfaces 42 of either or both of the plateable portions 26, 28, with even plated finishes. On the other hand, other surfaces, such as rear surfaces opposite the outer surfaces 42 of either or both of the plateable portions 26, 28, which may be hidden from view in a finished product, may be less critical to be evenly and cleanly plated. Thus, in some aspects, the barrier 24 and/or the outer surfaces 42 of either or both of the plateable portions 26, 28 may be configured to optimize the finishes on the class-A surfaces.

According to an aspect, the barrier 24 may include an outer barrier surface 48 that is non-coplanar with the outer surface 42 of one or both of the plateable portions 26, 28 at a location immediately adjacent to the barrier 24. According to other aspects, the outer barrier surface 48 may be recessed below the outer surface 42 of one or both of the plateable portions 26, 28. In some embodiments, the outer barrier surface 48 may extend outwardly above the outer surface 42 of one or both of the plateable portions 26, 28. For example, one or more of the plateable portions 26, 28 may include an irregular portion 44, 46 adjacent the barrier 24 and which is different than other parts of the associated one of the plateable portions 26, 28. The irregular portion 44, 46 may include, for example, a notch 44, a ramp portion 46, or a different finish or texture adjacent the barrier 24 to prevent the plating material from migrating from one of the plateable portions 26, 28 when the other one of the plateable portions 26, 28 is being electroplated.

Figure 12:
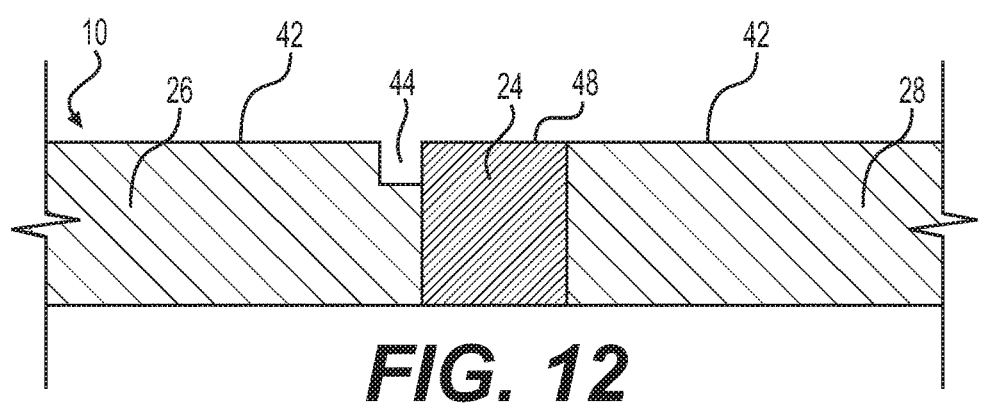
FIG. 12 is a cross-sectional side view of a part with an exemplary insulating barrier between two separate plateable regions according to still another aspect of the present disclosure.

For example, as shown in FIG. 12, the first plateable portion 26 may include an outer surface 42, which defines a notch 44 having a generally rectangular profile adjacent the barrier 24 and recessed below the outer surface 42. The notch 44 may have other profile shapes, such as a trapezoidal or triangular shape. According to some aspects, and as shown in FIG. 6, each of the plateable portions 26, 28 can include an outer surface 42 defining a notch 44 having a generally rectangular profile adjacent the barrier 24 and recessed below the outer surface 42. Additionally, and as shown in FIGS. 6 and 12, the outer barrier surface 48 may be coplanar with the outer surface 42 of one or both of the plateable portions 26, 28, except for a location immediately adjacent to the barrier 24, where an irregular portion 44, 46 of one or both of the plateable portions 26, 28 is non-coplanar with the outer barrier surface 48.

Figure 7:
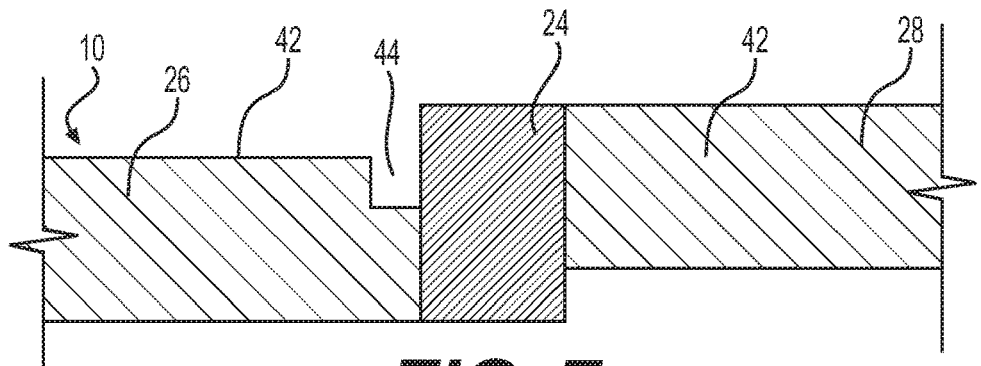
FIG. 7 is a cross-sectional side view of a part with an exemplary insulating barrier between two separate plateable regions according to yet another aspect of the present disclosure.
Figure 8:
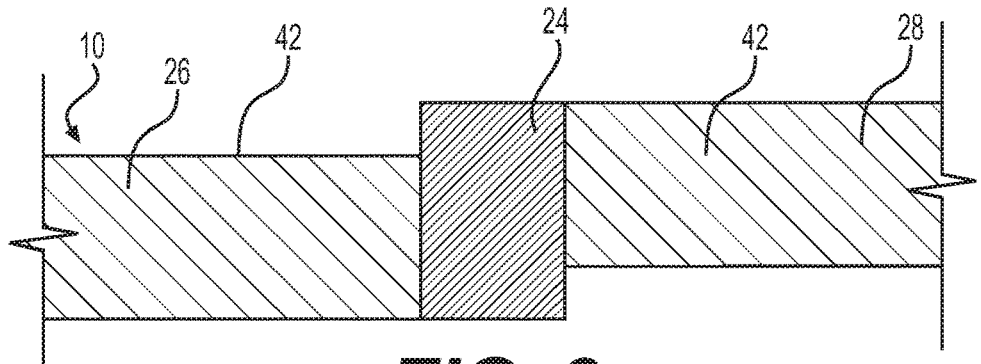
FIG. 8 is a cross-sectional side view of a part with an exemplary insulating barrier between two separate plateable regions according to still yet another aspect of the present disclosure.
Figure 9:
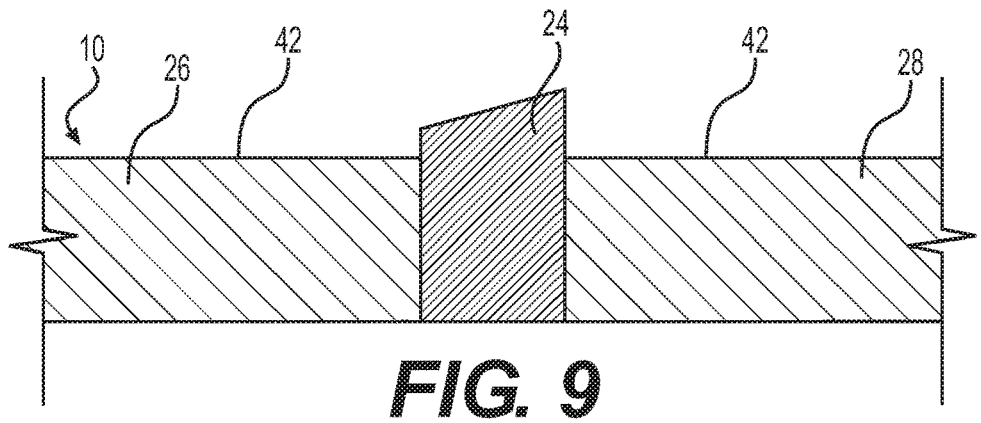
FIG. 9 is a cross-sectional side view of a part with an exemplary insulating barrier between two separate plateable regions according to yet a further aspect of the present disclosure.

According to another aspect, the outer surfaces 42 of each of the plateable portions 26, 28 may be coplanar. Examples of such configurations are shown in FIGS. 3-6, and 9-17. Alternatively, the outer surfaces 42 of each of the plateable portions 26, 28 may be parallel and staggered from one another to define a step. Examples of such configurations are shown in FIGS. 7 and 8. Such a stepped configuration between the outer surfaces 42 of each of the plateable portions 26, 28 can space the outer surfaces 42 to protect the associated plateable portions 26, 28 from the high current density (HCD) edge area.

Figure 15:
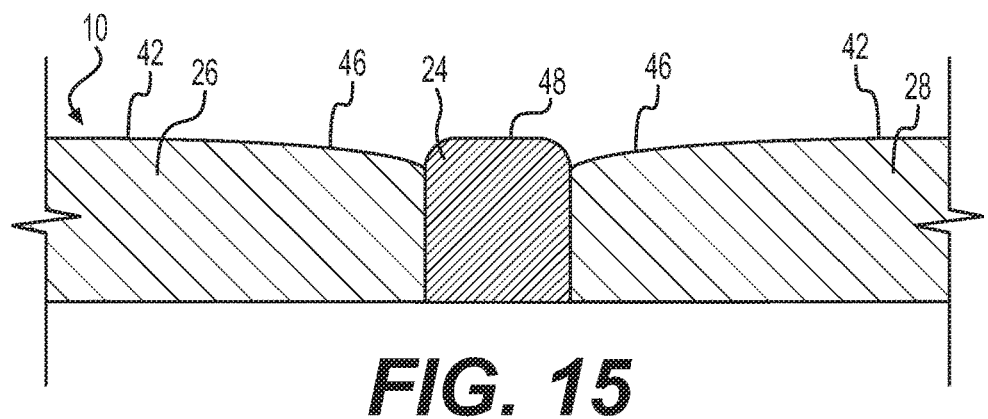
FIG. 15 is a cross-sectional side view of a part with an exemplary insulating barrier between two separate plateable regions according to yet a further aspect of the present disclosure.

According to another aspect of the disclosure, one or more of the plateable portions 26, 28 may include a ramp portion 46 adjacent the barrier 24 and sloping away from the outer surface 42 toward the barrier 24 to prevent the plating material from migrating from one of the plateable portions 26, 28 when the other one of the plateable portions 26, 28 is being electroplated. For example, as shown in FIG. 15, each of the plateable portions 26, 28 can include such a ramp portion 46. The ramp portions 46 may, therefore, act as shields to reduce high current density (HCD) edges of the plateable regions 20, 22. In the example shown in FIG. 15, the barrier 24 defines an outer barrier surface 48 which is coplanar with the outer surfaces 42 of the plateable portions 26, 28.

According to another aspect, the barrier 24 may be generally flush with the outer surfaces 42 of each of the plateable portions 26, 28 and not protrude outwardly beyond the outer surfaces 42. Examples of such configurations are shown in FIGS. 4, 6, and 12. Alternatively, the barrier 24 may extend outwardly beyond the outer surface 42 of at least one of the plateable portions 26, 28 in a direction transverse to the outer surface 42. Examples of such configurations are shown in FIGS. 3, 5, 7-11, and 13-14. The barrier 24 may extend, for example, about 0.25 to 0.5 mm beyond the outer surfaces 42, and may define a separation of about 1.2 mm between the plateable portions 26, 28. In the example shown in FIG. 9, the barrier 24 may extend proud of the outer surface 42 of one of the plateable portions 26, 28 by a first distance and raised above the outer surface 42 of the other one of the plateable portions 26, 28 by a second, larger distance. For example, the barrier 24 may extend 0.25 mm proud of the outer surface 42 of the first plateable portion 26 and 0.5 mm proud of the outer surface 42 of the second plateable portion 28.

Figure 13:
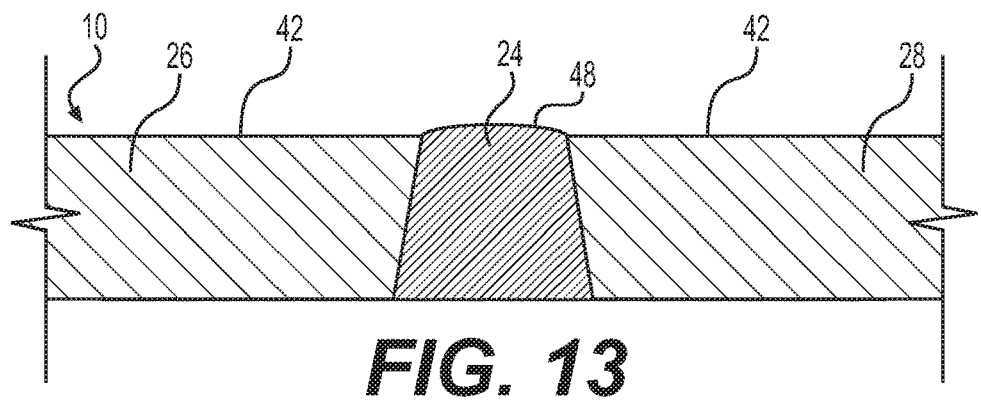
FIG. 13 is a cross-sectional side view of a part with an exemplary insulating barrier between two separate plateable regions according to yet another aspect of the present disclosure.

In the example shown in FIG. 13, the barrier 24 defines a trapezoidal cross-section. More specifically, the barrier 24 shown in FIG. 13 includes an outer barrier surface 48 having a convex shape that meets the outer surfaces 42 of the plateable portions 26, 28, but which bulges outwardly in a direction transverse to the outer surfaces 42.

Figure 16:
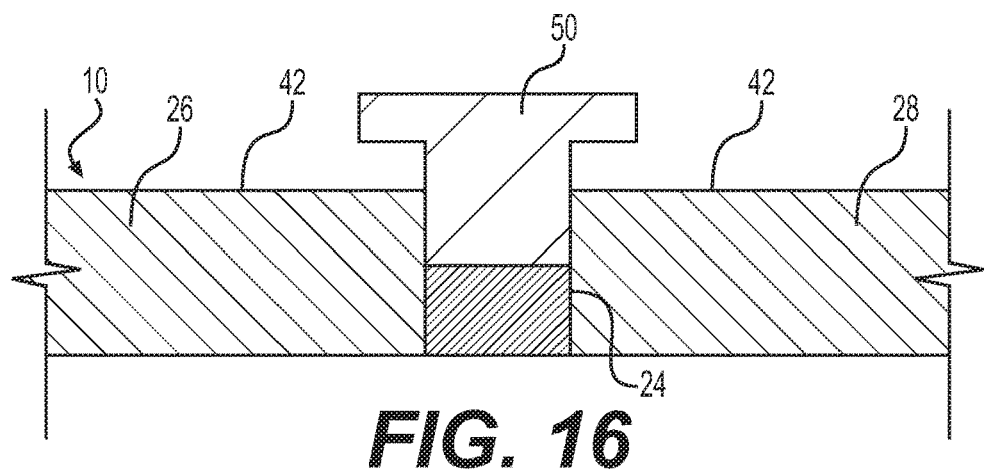
FIG. 16 is a cross-sectional side view of a part with an exemplary insulating barrier between two separate plateable regions according to still yet a further aspect of the present disclosure.

As illustrated in the example diagram on FIG. 16, a non-plateable insert 50 may be disposed between the plateable portions 26, 28 and configured to be removed after the plateable portions 26, 28 are electroplated. This may allow the barrier 24 to be entirely recessed below the outer surfaces 42 of the plateable portions 26, 28. The non-plateable insert 50 prevents high current density edges that would otherwise be formed as a result of the recessed barrier 24 and the non-electrified one of the plateable portions 26, 28 becoming bipolar during the plating of the other one of the plateable portions 26, 28. This arrangement may be advantageous since the non-plateable barrier 24 will be less prone to scratch and mar failures, and may allow for a design that is more aesthetically pleasing. The molded article 10 may be formed as a 3-shot part as shown in FIG. 16 where the non-plateable insert 50 is a third resin designed to have poor adhesion to the other resins. In this case, the molded article 10 may be plated with 2 or more finishes. The non-plateable insert 50 may be removed after plating revealing a resistive layer that is lower than the outer surfaces 42 of the plateable portions 26, 28.

Figure 17:
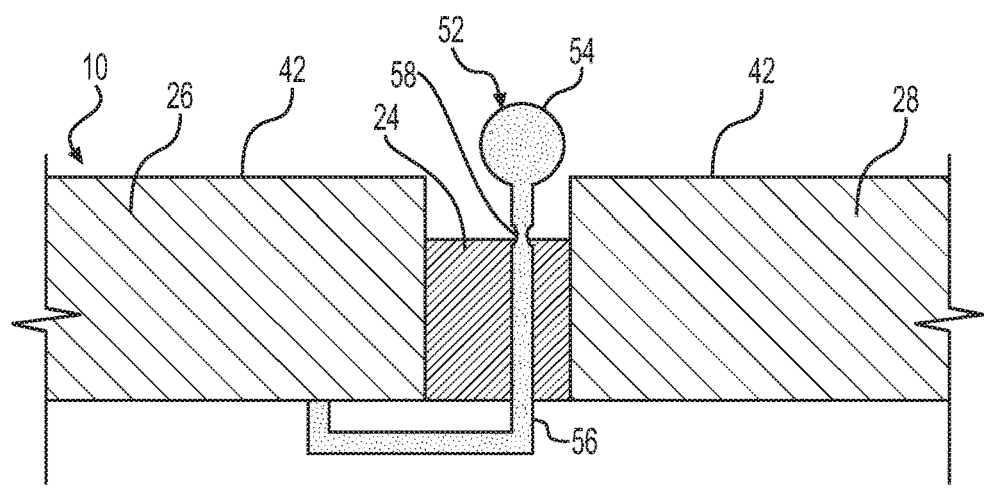
FIG. 17 is a cross-sectional side view of a part with an exemplary insulating barrier between two separate plateable regions according to still yet another aspect of the present disclosure.

As illustrated in the example diagram on FIG. 17, a current robber 52 of electrically conductive material may be connected in electrical communication with one of the plateable portions 26, 28 and disposed between the plateable portions 26, 28. The current robber 52 would function to rob current from the area between the electrically isolated plateable portions 26, 28 thereby minimizing the bipolar effect on the main body of the one of the plateable portions 26, 28 to which it is electrically connected. The current robber 52 may include a head 54 and include a conductive wire or strip 56 which makes electrical contact with one of the plateable portions 26, 28. The conductive wire or strip 56 may pass through or extend around the barrier 24 and away from the outer surfaces 42 of the plateable portions 26, 28 as shown in the example of FIG. 17. The head 54 of the current robber 52 may be configured to be removed after the plateable portions 26, 28 are electroplated such as for example, by cutting or trimming the conductive wire or strip 56, which may be performed in a subsequent step after plating. In some embodiments, the conductive wire or strip 56 may include a weakened location 58, which may be, for example, pre-stressed or thinned in order to control how much of the conductive wire or strip 56 remains after cutting or trimming. The weakened location 58 may be at, near, or recessed within a surface of the barrier 24.

In the example cross-section shown on FIG. 17, the first plateable portion 26 may act as a bipolar electrode during the plating of the second plateable portion 28. The plating on the current robber 52 above the barrier 24 would preferentially become anodic. Since the head 54 of the current robber 52 would be designed to be easily removed at the base of the first plateable portion 26, cosmetic defects of the current robber 52 due to anodic removal of metal would not be detrimental to the molded article 10 since the current robber 52 would be removed. According to an aspect, the current robber 52 may be an integral portion of the part and molded together with the remainder of the part. According to another aspect, the current robber 52 may be a separate part that is associated with the remainder of the part.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An automotive trim component having multiple surface finishes, comprising:
    a first plateable portion formed on a non-conductive thermoplastic substrate that is electrically conductive, the first plateable portion having a first outer surface;
    a second plateable portion formed on a non-conductive thermoplastic substrate that is electrically conductive, the second plateable portion having a second outer surface;
    a barrier formed of a thermoplastic resin disposed between the first plateable portion and the second plateable portion, the barrier formed of an electrically insulating material and configured to electrically isolate the first plateable portion of the trim component from the second plateable portion of the trim component;
    a first metal layer disposed on the first outer surface of the first plateable portion, the first metal layer formed of a first electroplated metal to provide a first appearance;
    a second metal layer disposed on the second outer surface of the second plateable portion, the second metal layer formed of a second electroplated metal to provide a second appearance;
    whereby the barrier mitigates the first electroplated metal or the second electroplated metal from migrating from one of the plateable portions when the other one of the plateable portions is being electroplated such that the first appearance and the second appearance are different; and
    wherein the barrier has a cross-sectional shape as one of a rectangle, a triangle, a trapezoid, a U-shape, a T-shape, or a parallelogram and at least partially extends over the first and second outer surfaces of each of the first and second plateable portions;

wherein the first metal layer and the second metal layer define first and second exterior facing and exposed outer surfaces
wherein the barrier is proud relative to one of the first and second exterior facing and exposed outer surfaces of the first and second metal layers in a direction transverse to the exterior facing and exposed outer surfaces.

2. The automotive trim component of claim 1, wherein the barrier is generally trapezoidal in a cross-section taken through the barrier and each of the first and second plateable portions, wherein the barrier has a width of the cross-section that reduces in a direction toward the exterior facing and exposed outer surfaces.

3. The automotive trim component of claim 1, wherein the barrier is U-shaped in a cross-section taken through the barrier and each of the first and second metal layers.

4. The automotive trim component of claim 1, wherein the barrier is triangular in a cross-section taken through the barrier and each of the first and second metal layers.

5. The automotive trim component of claim 1, wherein the barrier is rectangular in a cross-section taken through the barrier and each of the first and second metal layers.

6. The automotive trim component of claim 1, wherein the first and second exterior facing and exposed outer surfaces of each of the first and second metal layers are parallel and staggered from one another.

7. The automotive trim component of claim 1, wherein the barrier includes an outer barrier surface having a convex shape.

8. The automotive trim component of claim 7, wherein the outer barrier surface meets the outer surfaces of the plateable portions and bulges outwardly in the transverse direction.

9. The automotive trim component of claim 1, wherein the outer surfaces are co-planar with each other and an outer barrier surface of the barrier is non-coplanar and extends above the co-planar outer surfaces.

10. The automotive trim component of claim 1, wherein the exterior surface includes an upper surface and a lower surface, wherein the barrier extends outward from the upper surface and is flush with the lower surface.

11. An automotive trim component having multiple surface finishes, comprising:
a first plateable region including an associated first plateable layer of electrically conductive material having a first outer surface;
a second plateable region including an associated second plateable layer of electrically conductive material having a second outer surface;
a barrier formed of a thermoplastic resin disposed between the first plateable region and the second plateable region, the barrier formed of an electrically insulating material and configured to electrically isolate the first plateable region of the trim component from the second plateable region of the trim component;
a first metal layer disposed on the first outer surface of the first plateable layer, the first metal layer formed of a first electroplated metal to provide a first appearance;
a second metal layer disposed on the second outer surface of the second plateable layer, the second metal layer formed of a second electroplated metal to provide a second appearance;
wherein the first metal layer and the second metal layer define an exterior facing and exposed outer surface of the trim component;
whereby the barrier mechanically mitigates the first electroplated metal from migrating from the first plateable region when the second plateable region is being electroplated; and
wherein the barrier is proud relative to the exterior facing and exposed outer surface and projects outwardly beyond the exterior facing and exposed outer surface of the plateable regions at an area adjacent an interface defined between the exterior facing and exposed outer surface and the barrier, wherein the barrier projects in a direction transverse to the exterior facing and exposed outer surface at the area adjacent the interface.

12. The automotive trim component of claim 11, wherein the barrier has a convex outer barrier surface.

13. The automotive trim component of claim 11, wherein the exterior facing and exposed outer surfaces are co-planar.

14. The automotive trim component of claim 11, wherein the outwardly projecting barrier reduces current density at an edge of the exterior facing and exposed first outer surface adjacent the barrier.

15. An automotive trim component having multiple surface finishes, comprising:
a first plateable portion disposed on a non-conductive plastic substrate and defining a first outer surface;
a second plateable portion disposed on a non-conductive plastic substrate and defining a second outer surface;
a barrier formed of a thermoplastic resin disposed between the first plateable portion and the second plateable portion, the barrier formed of an electrically insulating material and configured to electrically isolate the first plateable portion of the trim component from the second plateable portion of the trim component;
a first metal layer disposed on the first outer surface of the first plateable portion, the first metal layer formed of a first electroplated metal to provide a first appearance;
a second metal layer disposed on the second outer surface of the second plateable portion, the second metal layer formed of a second electroplated metal to provide a second appearance;
whereby the barrier mechanically reduces current density at a first edge of the first metal layer adjacent the barrier and at a second edge of the second metal layer adjacent the barrier and mitigates the first electroplated metal of the first metal layer from deplating from the first plateable portion into a plating solution when the second plateable portion is being electroplated;
wherein the first and second metal layers define exterior facing and exposed outer surfaces of the trim component;
wherein the barrier is projects outwardly beyond and is proud relative to adjacent areas of the exterior facing and exposed outer surfaces.

16. The automotive trim component of claim 15, wherein the barrier projects outwardly beyond the exterior facing and exposed outer surface at the first and second edges in a direction transverse to the exterior facing an exposed outer surface.

17. The automotive trim component of claim 15, wherein the barrier defines an outer barrier surface that intersects the exterior facing and exposed outer surface at the first and second edges and bulges outwardly therebetween.

18. The automotive trim component of claim 15, wherein the exterior facing and exposed outer surfaces are co-planar and the barrier has a convex outer surface that projects outwardly from the co-planar exterior facing and exposed outer surfaces.

* * * * *